United States Patent [19]

Krahe

[11] 4,075,787
[45] Feb. 28, 1978

[54] INFLATABLE POUCH TO SEAL

[75] Inventor: James B. Krahe, Erie, Pa.

[73] Assignee: American Sterilizer Company, Erie, Pa.

[21] Appl. No.: 742,497

[22] Filed: Nov. 17, 1976

Related U.S. Application Data

[63] Continuation of Ser. No. 592,920, July 7, 1975, abandoned.

[51] Int. Cl.² ............................................. E05D 15/10
[52] U.S. Cl. ....................................... 49/209; 49/477
[58] Field of Search ................................. 49/209, 477

[56] References Cited

U.S. PATENT DOCUMENTS

| | | | |
|---|---|---|---|
| 3,500,584 | 3/1970 | Clery et al. | 49/209 |
| 3,694,960 | 10/1972 | Miraldi | 49/209 |
| 3,918,512 | 11/1975 | Kuneman | 49/477 X |

Primary Examiner—Kenneth Downey
Attorney, Agent, or Firm—Charles L. Lovercheck

[57] ABSTRACT

A door and an inflatable pouch seal and opening to be closed by said door. The door is made up of an outer door and an inner door, with the inflatable pouch between them. The outer door, inner door and pouch are received between an end frame and the end of the sterilizer chamber so that when the pouch in inflated, it forces the outer door outward, against the end frame thereby providing a reaction forcing the inner door against the end of the sterilizer and against a gasket around the door, thereby providing a seal.

2 Claims, 4 Drawing Figures

INFLATABLE POUCH TO SEAL

This is a continuation of Ser. No. 592,920, filed July 7, 1975 now abandoned.

REFERENCE TO PRIOR ART

The disclosure provides an improvement over the disclosure in the U.S. Pat. No. 3,500,584, issued to Clary on Mar. 17, 1970 and Pat. No. 2,858,096.

GENERAL DESCRIPTION OF INVENTION

The invention disclosed herein involves an inflatable pouch to force vertical or horizontally sliding sterilizer doors against seals. The inflatable pouch is placed between the inner door plate and the outer door plate. The door assembly may be lowered into place in front of the sterilizer door between the outer frame and the end frame of the sterilizer chamber and the inflatable pouch is then pressureized with sufficient air pressure to exceed the chamber inner pressure. The door disclosed herein is applicable to present sterilizer designs and is also applicable to sterilizer doors of larger sizes. The design provides an inflatable pouch seal, an inner sterilizer door and an outer sterilizer door and an end frame. When the pouch is inflated, the necessary seal is created for the sterilizer door. This eliminates the present use of either locking arms or cams which are used to lock and seal sterilizer doors and it eliminates all cams, shafts, gear drives and motors used in present designs of locking mechanisms. The design presents considerable cost saving over the present designs and eliminate the present requirements of very close shop tolerances on doors and frame and the like since two door plates, independent of each other, move along with the inflatable pouch and have sufficient play within the design to compensate for any misalignment. This also eliminates any of the existing problems that occur in manufacture and use of locking mechanisms according to present designs.

OBJECTS OF THE INVENTION

It is an object of the invention to provide an improved door and locking mechanism.

Another object of the invention is to provide an improved door and locking mechanism for a sterilizer.

Another object of the invention is to provide a sterilizer door that is simple in construction, economical to manufacture and simple and efficient to use.

With the above an other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF DRAWINGS

DETAILED DESCRIPTION OF DRAWING

Figure 1:
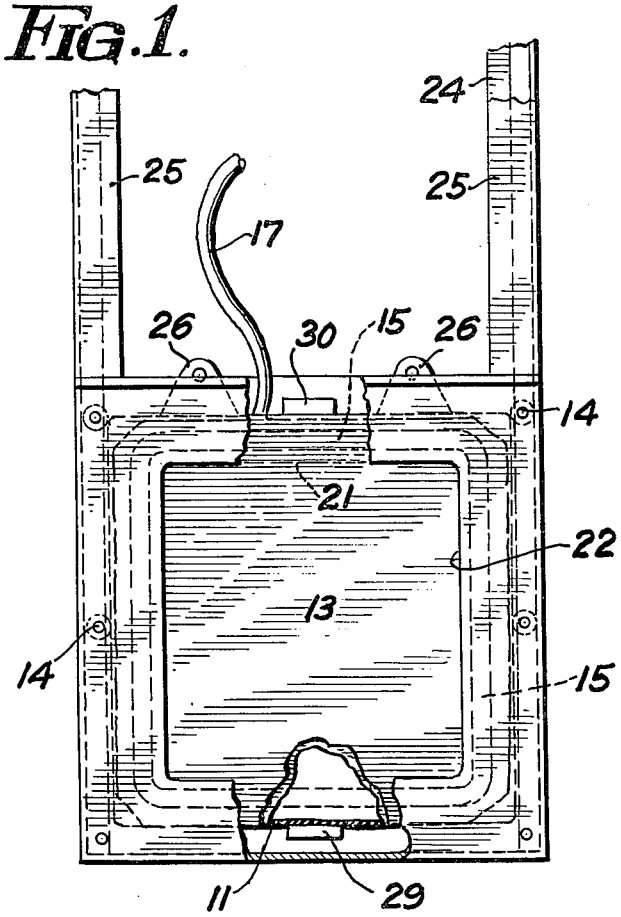
FIG. 1 is a front view, partly broken away, showing the door and associated parts according to the invention.

Now with more particular reference to the drawing, the combination shows a sterilizer chamber 10 which may be one of the conventional steam sterilizer chambers, having a steam jacket 20 made up of an inner shell and an outer shell defining said jacket. The chamber has the end flange 19 welded to it which closes the end of the steam jacket and presents a smooth, outwardly directed surface 18 on which the door gasket 15 is supported. The door gasket 15 extends entirely around the door opening 21. The end frame 16 is spaced outwardly from the end flange 19 and provides a space therebetween which receives the doors 12 and 13. The end frame has an opening 22 and the end flange has a door opening 21. Openings 21 and 22 are in alignment with each other and chamber 10 may be loaded through the doors 12 and 13 when they are moved up to open position between the door guides 24 and 25. A suitable lifting mechanism may be provided having cables that will connect to the ears 26 that are fixed to the top of the door.

The door is made up of the inner door 12 and the outer door 13 with the pouch 11 between them. The inner door 12 and the outer door 13 are each flat plate-like members and guide pins 29 are fixed at the lower edge of the inner door 12 and upper guide pins 30 are fixed to the upper edge of the outer door 13. Pins 29 and 30 guide the inner door 12 and the outer door 13 to move toward or away from each other when the pouch 11 is inflated and deflated.

Pouch 11 is a relatively flat bag made of rubber, plastic or a material having similar properties of flexability.

The air line 17 is integrally attached to the upper end of the pouch 11 and, a suitable valve mechanism connected to a source of air under pressure, and a vaccum will be connected to the line 17 for deflating the pouch.

Figure 2:
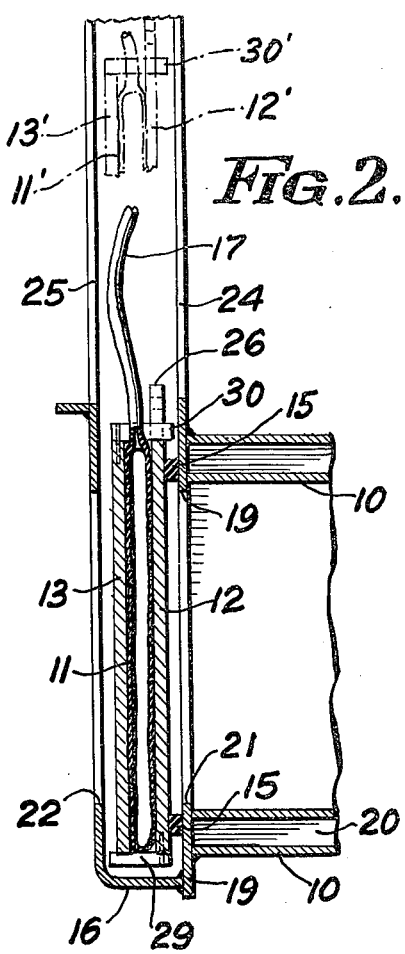
FIG. 2 is a partial longitudinal cross-sectional view of the sterilizer door and chamber of FIG. 1 showing the pouch in deflated position.
Figure 3:
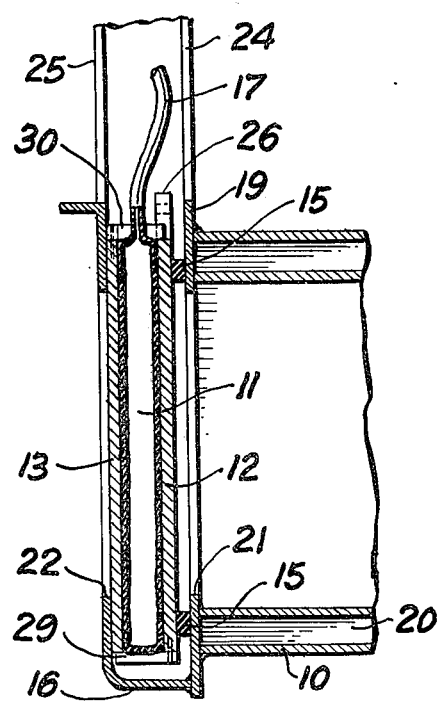
FIG. 3 is a view similar to FIG. 2 showing the pouch inflated.
Figure 4:
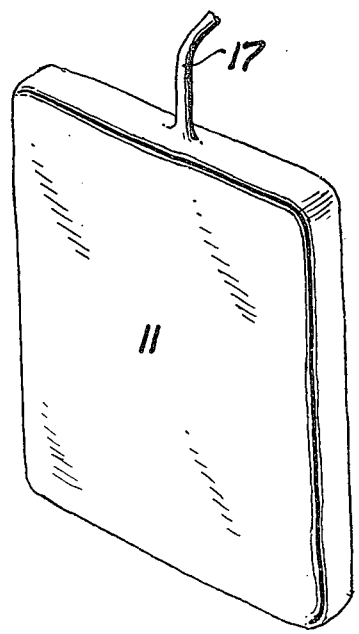
FIG. 4 is an isometric view of the pouch used in the doors according to the invention.

When the door is to be opened or closed, the pouch 11 will be deflated as shown in FIG. 2, so that the inner door and outer door can move toward each other. Roller guides 14, of a type familiar to those skilled in the art, will be fixed to the outer edges of the door frame for guiding the doors 12 and 13 up and down.

When the door is open, it will be pulled up between guide frames 24 and 25 to the position indicated in dash lines in FIG. 2 and indicated at 30', 12' and 13'. When the door is to be closed, it will be lowered to the position shown in FIG. 2. The pouch will then be inflated, this will force doors 12 and 13 away from each other and the inner door forced into engagement with the gasket 15 and the outer door forced outward into engagement with the frame 22.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a chamber comprising a steam jacket having an inner shell and an outer shell terminating at an end in a door opening, a plate-like flange fixed to said shells around said opening and said flange forming a closure for said steam jacket and presenting an outwardly directed surface, an end frame fixed to said flange, a sealing member on said flange on said outwardly directed surface extending entirely around said door opening, said end frame being disposed outwardly in spaced relation to said flange and providing a space therebetween, said flange having an opening registering with said chamber opening, a door member disposed between said flange and said end frame, said door member comprising an outer door and an inner door defining a space therebetween and disposed in said space between said flange and said frame, said inner door having laterally spaced guide pins along the lower edge thereof slidably engaging said outer door, an inflatable pouch disposed between said outer door and said inner door and overlying said outer door and said inner door, and said opening and being substantially larger than said opening whereby the edges of said pouch extend outwardly beyond the flange defining said opening, said pouch being adapted to be inflated whereby said outer door and said inner door are forced away from each other forcing said outer door against said frame and bringing said inner door into sealing engagement with said sealing member on said end flange and means for moving said door between said frame and said flange from a position overlying said opening to a position away from said opening, 2. In combination, a chamber and a door comprising, an inner shell defining a chamber space open at one end, an outer shell disposed around said inner shell and defining a steam jacket space therebetween, the ends of said shells terminating in a generally vertical plane, a plate-like end flange disposed generally in a vertical plane and fixed to the ends of said shells forming a closure for said steam jacket space, said plate-like end flange having an outwardly directed surface and a door opening through said flange, a sealing means on said outwardly directed surface around said door opening, a frame, means attaching said frame to said chamber, said frame having a vertically extending guide frame member having a side generally parallel to said surface on said flange and defining with said flange a space for a door member therebetween, an opening in said frame registering with said door opening, a door member in said space between said flange and said frame, said door member in said space between said flange and said frame, said door member comprising an outer door and an inner door, said inner door having laterally spaced pin means fixed to its lower edge underlying said inner door and slidably engaging said outer door, said outer door having laterally spaced pin means overlying said inner door, said pouch being substantially larger than said door opening in said flange, an opening in said frame being generally lined with a door opening in said flange, said pouch being adapted to be inflated whereby said outer door is forced into engagement with said frame bringing said inner door into sealing engagement with said sealing means on said end flange, and means to move said door member from said door opening.

* * * * *